US012600146B2

(12) United States Patent
Kitamura et al.

(10) Patent No.: US 12,600,146 B2
(45) Date of Patent: Apr. 14, 2026

(54) CONTROL DEVICE, PRINTER APPARATUS, AND CONTROL METHOD

(71) Applicant: Seiko Instruments Inc., Chiba (JP)

(72) Inventors: Yoshio Kitamura, Chiba (JP); Daisuke Yoshida, Chiba (JP); Ryuji Uno, Chiba (JP); Koichi Hatakeyama, Chiba (JP); Hiroaki Kondo, Chiba (JP); Ryota Naka, Chiba (JP); Takahiro Hisada, Chiba (JP)

(73) Assignee: Seiko Instruments Inc., Chiba (JP)

( * ) Notice: Subject to any disclaimer, the term of this patent is extended or adjusted under 35 U.S.C. 154(b) by 130 days.

(21) Appl. No.: 18/600,275

(22) Filed: Mar. 8, 2024

(65) Prior Publication Data

US 2024/0308240 A1      Sep. 19, 2024

(30) Foreign Application Priority Data

Mar. 14, 2023      (JP) ................................. 2023-039320

(51) Int. Cl.
*B41J 2/38*          (2006.01)
*B41J 2/355*         (2006.01)
(Continued)

(52) U.S. Cl.
CPC ................. *B41J 2/38* (2013.01); *B41J 2/355* (2013.01); *B41J 29/393* (2013.01); *G06F 3/1211* (2013.01)

(58) Field of Classification Search
CPC ..... B41J 2/3556; B41J 2/35; B41J 2/38; B41J 2/355; B41J 2/32; B41J 29/393; G06F 3/1211; G06K 15/028
See application file for complete search history.

(56) References Cited

U.S. PATENT DOCUMENTS

| 2015/0273858 A1 | 10/2015 | Minami |
| 2019/0270315 A1 | 9/2019 | Kawamoto |
| 2021/0402811 A1 | 12/2021 | Saga |

FOREIGN PATENT DOCUMENTS

| EP | 3 357 701 A1 | 8/2018 |
| JP | 2019-151010 A | 9/2019 |

OTHER PUBLICATIONS

Search Report in European Application No. 24161901, dated Jul. 19, 2024 (6 pages).

*Primary Examiner* — Kristal Feggins
(74) *Attorney, Agent, or Firm* — Crowell & Moring LLP

(57)          ABSTRACT

A control device includes: a print data acquisition unit configured to acquire print data, which is formed of a plurality of lines and indicates a coloration state of each pixel included in the plurality of lines; a head drive unit configured to supply, to a thermal head formed of a plurality of heating elements each corresponding to the pixel, an electric current for heating the thermal head for each pixel; a motor drive unit configured to supply, to a motor configured to move heat-sensitive paper relative to the thermal head, a drive current for step driving the motor for each line; a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed.

13 Claims, 10 Drawing Sheets

(51) Int. Cl.
  *B41J 29/393* (2006.01)
  *G06F 3/12* (2006.01)

THERMAL PRINTER APPARATUS

THERMAL PRINTER MECHANISM — 10

120 — THERMAL HEAD          MOTOR — 110

CONTROL UNIT — 20

250 — HEAD DRIVE UNIT     MOTOR DRIVE UNIT — 230

240 — PREHEATING CONTROL UNIT

MOTOR DRIVE PLAN GENERATION UNIT — 220

PRINT DATA ACQUISITION UNIT — 210

CONTROL DEVICE, PRINTER APPARATUS, AND CONTROL METHOD

RELATED APPLICATIONS

This application claims priority to Japanese Patent application No. JP2023-039320 filed on Mar. 14, 2023, the entire content of which is incorporated herein by reference.

BACKGROUND OF THE INVENTION

1. Field of the Invention

The present invention relates to a control device, a printer apparatus, and a control method.

2. Description of the Related Art

Hitherto, there has been known a line printer apparatus including a thermal head. The line printer apparatus moves heat-sensitive paper by one line each time printing of one line is finished. Further, the line printer apparatus is increased in power consumption with an increase in number of dots (number of colored pixels) per line printed on the heat-sensitive paper. When the number of colored pixels is a predetermined value or more, power consumption for coloration may exceed a supply capacity of a power supply mounted in the line printer apparatus. In such a case, time division printing in which dots of one line are time-divided into a plurality of parts for printing is performed. When the time division printing is performed, a significant change in paper feeding speed may lead to a reduction in printing quality.

In order to suppress such a reduction in printing quality, there is known a technology for reducing a fluctuation in paper feeding speed by causing an electric current to flow through a thermal head even when a printing operation is not performed to reduce a reduction in temperature of the thermal head, and hence suppress an instantaneous increase in power consumption for coloring and reduce time for the time division printing (see Japanese Patent Application Laid-open No. 2019-151010, for example).

However, with the related art described above, there has been a problem in that, with the electric current flowing through the thermal head even when the printing operation is not performed, the power consumption is increased. There has also been a problem in that, when the electric current to flow through the thermal head is reduced in order to reduce the power consumption, the fluctuation in paper feeding speed is increased, and the printing quality is reduced. That is, with the related art described above, there has been a problem in that it is difficult to achieve both the printing quality and the reduction in power consumption.

The present disclosure has been made in view of the above-mentioned circumstances, and therefore has an object to achieve both printing quality and a reduction in power consumption.

SUMMARY OF THE INVENTION

According to one embodiment of the present invention, there is provided a control device, the control device including: a print data acquisition unit configured to acquire print data, which is formed of a plurality of lines and indicates a coloration state of each pixel included in the plurality of lines; a head drive unit configured to supply, to a thermal head formed of a plurality of heating elements each corresponding to the pixel, an electric current for heating the thermal head for each pixel; a motor drive unit configured to supply, to a motor configured to move heat-sensitive paper relative to the thermal head, a drive current for step driving the motor for each line; a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed.

In the above-mentioned control device according to the one embodiment of the present invention, wherein the preheating control unit is configured to control a heating state of the thermal head to be obtained by the preheating current by changing, based on the number of colored pixels of the determination subject line, at least one of the number of lines for which the preheating current is output or an output time of the preheating current per line.

In the above-mentioned control device according to the one embodiment of the present invention, wherein the preheating control unit is configured to control a heating state of the thermal head to be obtained by the preheating current by changing, based on the number of yet-to-be-printed lines up to the determination subject line, at least one of the number of lines for which the preheating current is output or an output time of the preheating current per line.

In the above-mentioned control device according to the one embodiment of the present invention, wherein the preheating control unit is configured to control a heating state of the thermal head to be obtained by the preheating current by changing an output time of the preheating current per line.

In the above-mentioned control device according to the one embodiment of the present invention, wherein the preheating control unit is configured to control a heating state of the thermal head to be obtained by the preheating current by changing the number of lines for which the preheating current is output.

In the above-mentioned control device according to the one embodiment of the present invention, wherein the speed control unit is configured to reduce the relative moving speed with a deceleration rate equal to or lower than an acceleration rate of the motor at a start of printing.

According to one embodiment of the present invention, there is provided a printer apparatus, the printer apparatus including: the control device; the thermal head; and the motor.

According to one embodiment of the present invention, there is provided a control method, the control method including: acquiring print data, which is formed of a plurality of lines and indicates a coloration state of each pixel included in the plurality of lines; supplying, to a thermal head formed of a plurality of heating elements each corresponding to the pixel, an electric current for heating the thermal head for each pixel; supplying, to a motor configured to move heat-sensitive paper relative to the thermal head, a drive current for step driving the motor for each line; controlling, based on the number of colored pixels of a determination subject line among yet-to-be-printed lines of the print data, a relative moving speed of the heat-sensitive paper moved by the motor; and outputting, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed.

BRIEF DESCRIPTION OF THE DRAWINGS

FIG. 2A, FIG. 2B, and FIG. 2C are views for illustrating an example of print data in the at least one embodiment.

DETAILED DESCRIPTION OF THE PREFERRED EMBODIMENTS

Now, at least one embodiment of the present invention is described with reference to the drawings. In the following description, components having the same or similar function are denoted by the same reference symbols. In some cases, overlapping description of the components is omitted.

Figure 1:
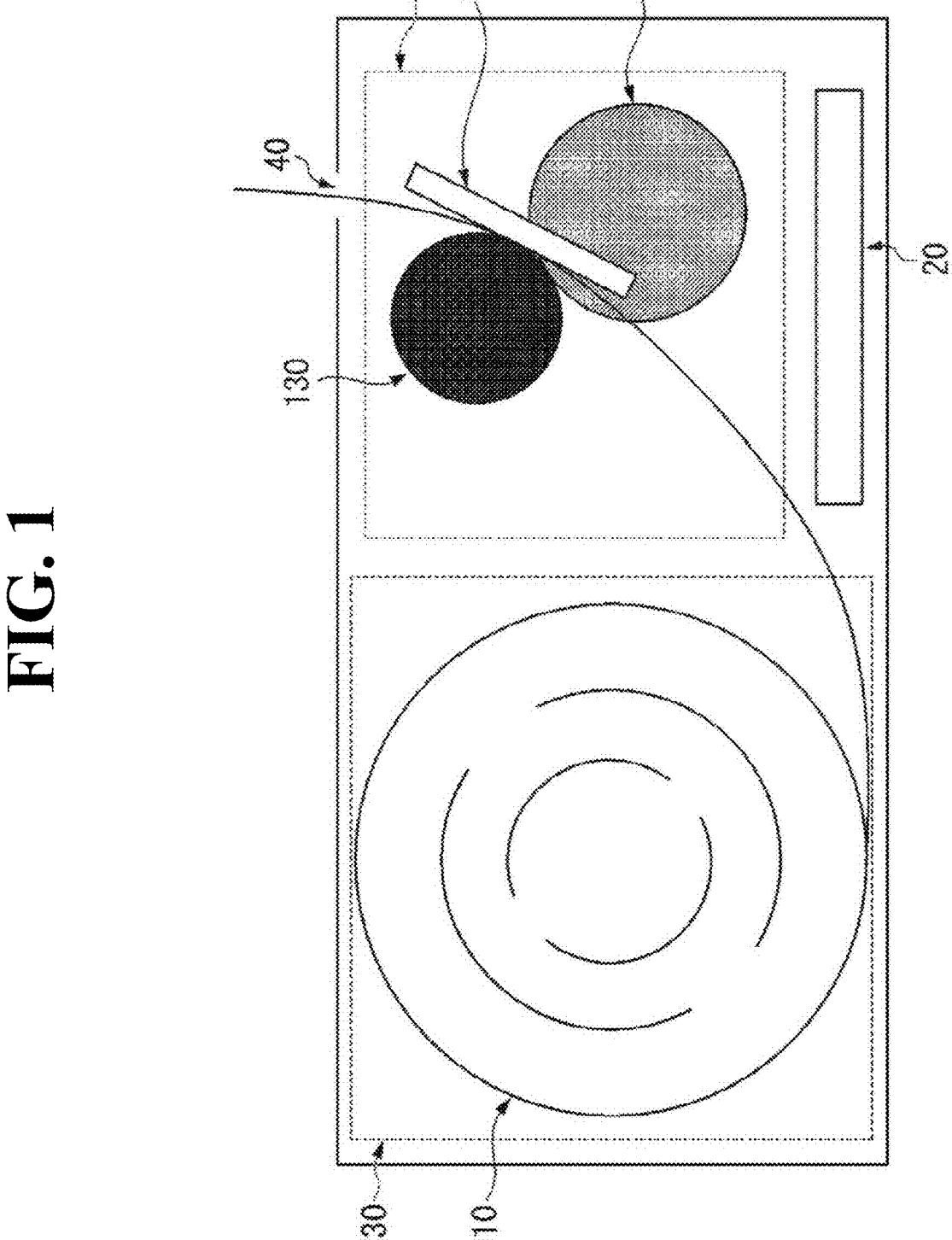
FIG. 1 is a schematic cross-sectional view for illustrating a printer apparatus according to at least one embodiment of the present invention.

FIG. 1 is a schematic cross-sectional view for illustrating a printer apparatus 1 according to at least one embodiment of the present invention. The printer apparatus 1 includes a thermal printer mechanism 10, a control unit 20, a sheet receiving portion 30, and a sheet discharge portion 40. The sheet receiving portion 30 receives heat-sensitive paper 310. The heat-sensitive paper 310 in the at least one embodiment is roll paper, for example. When applied with heat equal to or higher than a coloration threshold value th1, the heat-sensitive paper 310 is colored in a portion applied with the heat. The sheet discharge portion 40 discharges a sheet printed by the thermal printer mechanism 10 (that is, printed heat-sensitive paper 310) to the outside of the printer apparatus 1.

The thermal printer mechanism 10 includes a motor 110, a thermal head 120, and a platen roller 130.

The motor 110 drives the platen roller 130 to rotate under control of the control unit 20. The platen roller 130 moves the heat-sensitive paper 310 by rotating with a rotation of the motor 110 while urging a coloration surface of the heat-sensitive paper 310 against the thermal head 120. As a result, the heat-sensitive paper 310 is moved relative to the thermal head 120. That is, the motor 110 moves the heat-sensitive paper 310 relative to the thermal head 120 via the platen roller 130. In the following description, moving the heat-sensitive paper 310 relative to the thermal head 120 by the motor 110 is also referred to as "paper feeding."

The "relative movement" as used herein means relative movement between the heat-sensitive paper 310 and the thermal head 120. That is, the relative movement includes a case in which the thermal head 120 is fixed and the heat-sensitive paper 310 is moved, a case in which the heat-sensitive paper 310 is fixed and the thermal head 120 is moved, and a case in which both of the heat-sensitive paper 310 and the thermal head 120 are moved. In the at least one embodiment, description is made assuming that the thermal head 120 is fixed and the heat-sensitive paper 310 is moved with respect to the thermal head 120.

The thermal head 120 is what is called a line thermal head in which a plurality of heating elements H are arrayed in one line. The thermal head 120 colors a desired position of the heat-sensitive paper 310 by applying heat to the heat-sensitive paper 310, which is urged against the platen roller 130, under control of the control unit 20.

The control unit 20 includes a computer device. The control unit 20 controls the motor 110 and the thermal head 120 based on programs stored in a storage unit (not shown), and on print data stored in the storage unit (not shown) or print data supplied from an external device (not shown). An example of the print data is described with reference to FIG. 2A to FIG. 2C.

Figures 2A, 2B, 2C:
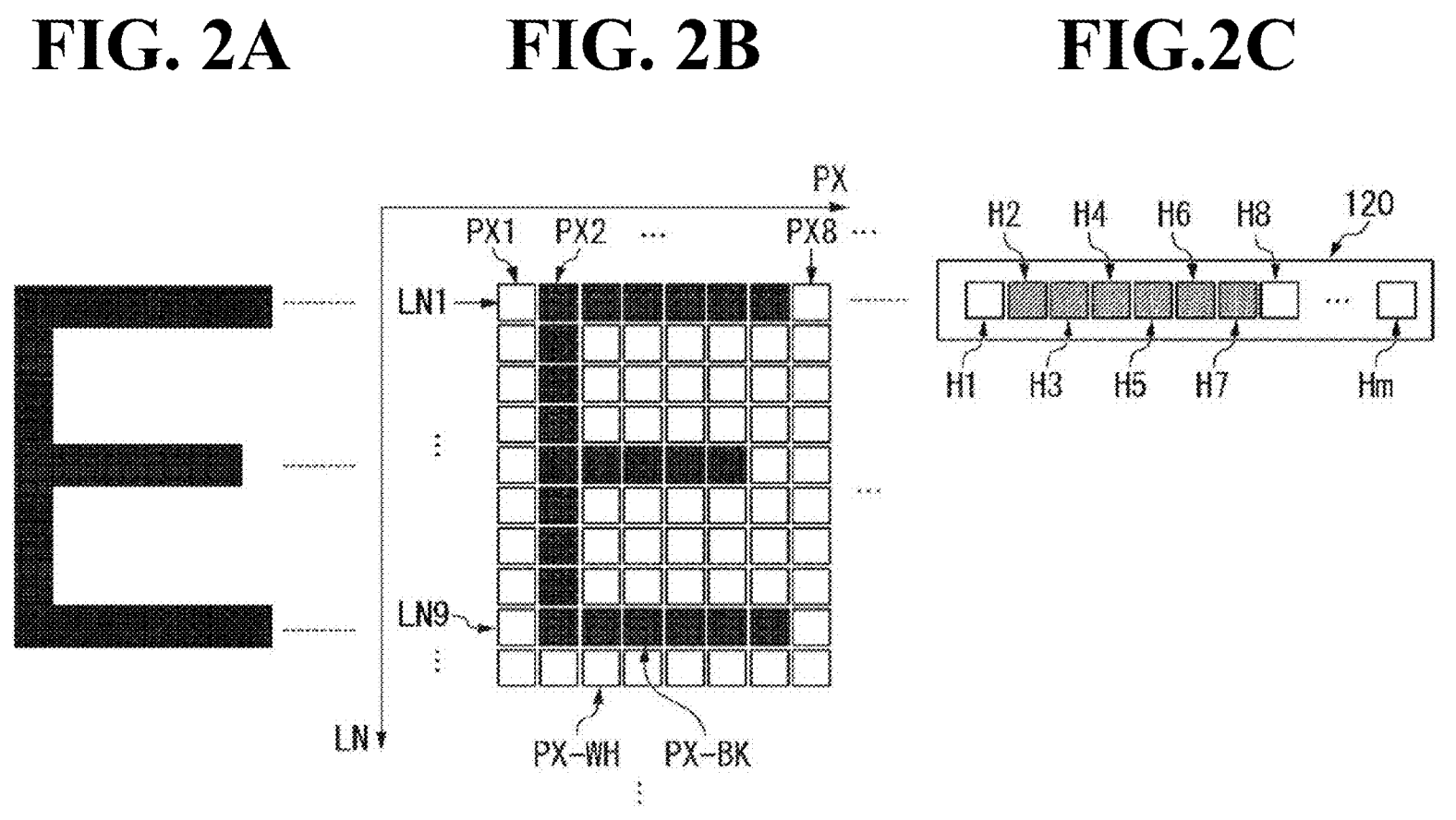

FIG. 2A to FIG. 2C are views for illustrating an example of the print data in the at least one embodiment. FIG. 2A is a view for illustrating an example of a letter or figure to be printed (hereinafter also simply referred to as "object to be printed"). In this example, the object to be printed is a letter "E".

FIG. 2B is a view for illustrating an example of the print data. The print data is formed of rows and columns (matrix) in a pixel PX direction and a line LN direction. In this example, the print data is binarized data in which each pixel PX expresses the object to be printed in a binary value of black or white. The print data being the binarized data is merely an example. The print data may be multi-valued data in which each pixel PX is expressed in gradation of multiple levels between black and white.

In the example of FIG. 2B, the print data indicates the letter "E" being the object to be printed. Of the pixels PX indicating the letter "E", a portion in which the heat-sensitive paper 310 is colored black is also referred to as "black pixels PX-BK." In addition, of the pixels PX indicating the letter "E", a portion in which the heat-sensitive paper 310 is not colored is also referred to as "white pixels PX-WH." That is, in such binarized print data as in the at least one embodiment, the object to be printed is expressed by the black pixels PX-BK and the white pixels PX-WH. In the following description, when necessary, coordinates of the print data are expressed by a number of a line LN (line LN1 to line LNn; n is a natural number) in a vertical direction of FIG. 2B and a number of a pixel PX (pixel PX1 to pixel PXm; m is a natural number) in a horizontal direction of FIG. 2B.

FIG. 2C is a view for illustrating an example of a configuration of a portion of the heating elements H of the thermal head 120 in the at least one embodiment. The thermal head 120 is formed of the plurality of heating elements H each corresponding to the pixel PX. In the case of the example illustrated in FIG. 2C, the thermal head 120 includes heating elements H1 to Hm corresponding to one line of pixel PX1 to pixel PXm, respectively.

Figures 3A, 3B:
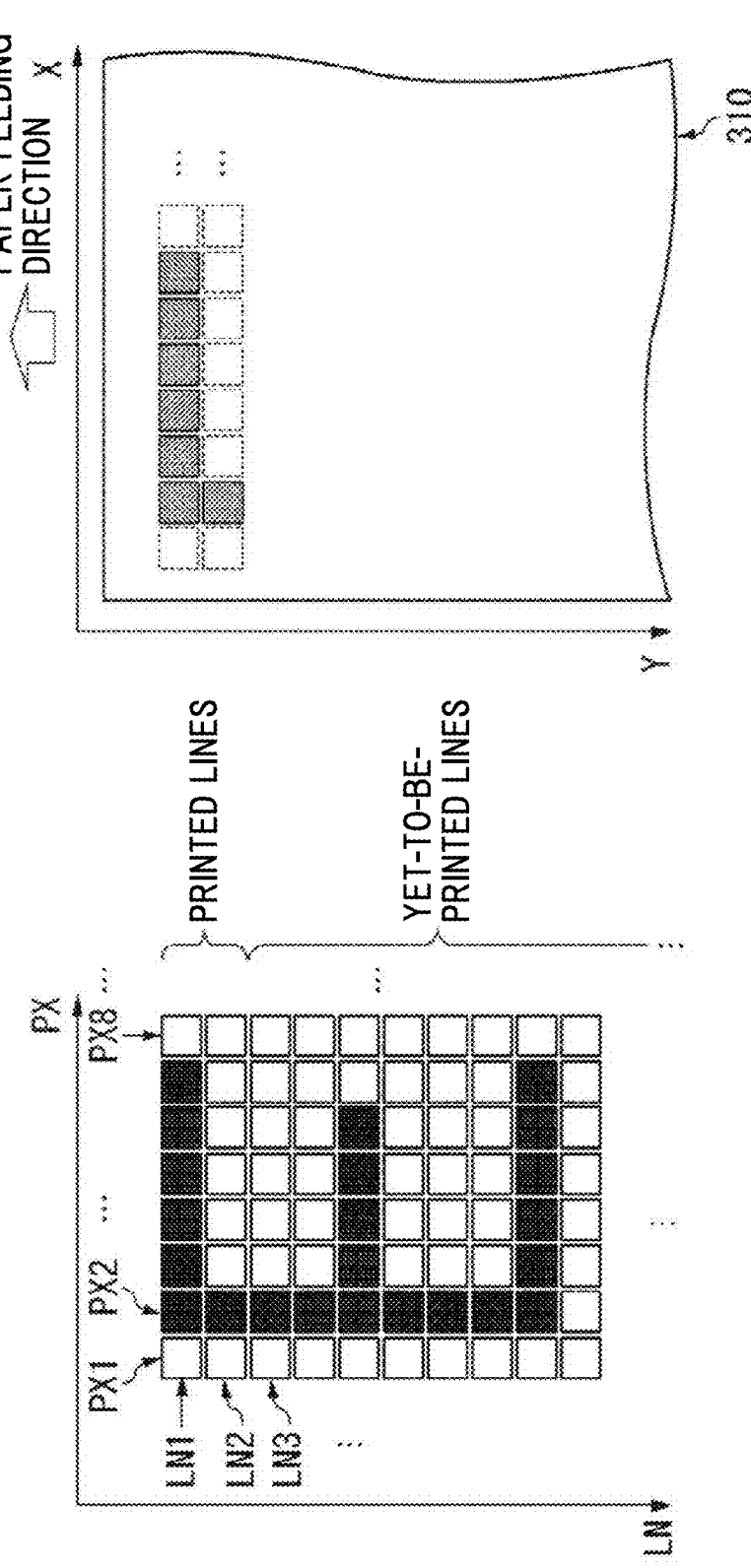
FIG. 3A and FIG. 3B are views for illustrating a correspondence between the print data and a printing result in the at least one embodiment.

FIG. 3A and FIG. 3B are views for illustrating a correspondence between the print data and a printing result in the at least one embodiment. FIG. 3A shows print data similar to the print data illustrated in FIG. 2B. FIG. 3B is a view for illustrating an example of a result of printing on the heat-sensitive paper 310 based on the print data. As described above, the thermal head 120 includes the plurality of heating elements H corresponding to the pixels PX of the print data. The thermal head 120 heats heating elements H corresponding to the black pixels PX-BK among the pixels PX of the print data. The thermal head 120 colors the heat-sensitive paper 310 at printing target positions on the heat-sensitive paper 310 corresponding to the black pixels PX-BK by applying heat equal to or higher than the coloration threshold value th1 to the printing target positions through heat generation by the heating elements H. In the following description, causing the heating elements H corresponding to the black pixels PX-BK to generate heat to color the heat-sensitive paper 310 at the printing target positions is also referred to as "printing by the thermal head 120" or simply as "printing."

The thermal head 120 in the at least one embodiment is what is called a line thermal head and performs printing for each line LN. In the example illustrated in FIG. 3B, two lines LN of line LN1 and line LN2 have been printed. In the following description, of a plurality of lines LN included in the print data, lines LN that have been printed on the heat-sensitive paper 310 are also referred to as "printed lines," and lines LN that have not been printed (and are scheduled to be printed) on the heat-sensitive paper 310 are also referred to as "yet-to-be-printed lines." The control unit 20 which controls such printing by the thermal head 120 is described in detail with reference to FIG. 4.

Figure 4:
FIG. 4 is a diagram for illustrating an example of functional components of a control unit in the at least one embodiment.

FIG. 4 is a diagram for illustrating an example of functional components of the control unit 20 in the at least one embodiment. The control unit 20 includes a print data acquisition unit 210, a motor drive plan generation unit 220, a motor drive unit 230, a preheating control unit 240, and a head drive unit 250.

The print data acquisition unit 210 acquires the print data from the storage unit (not shown) or the external device (not shown). As described above, the print data is data which is formed of the plurality of lines LN and indicates a coloration state of each pixel PX included in the lines LN. An example of the print data is illustrated in FIG. 5.

Figure 5:
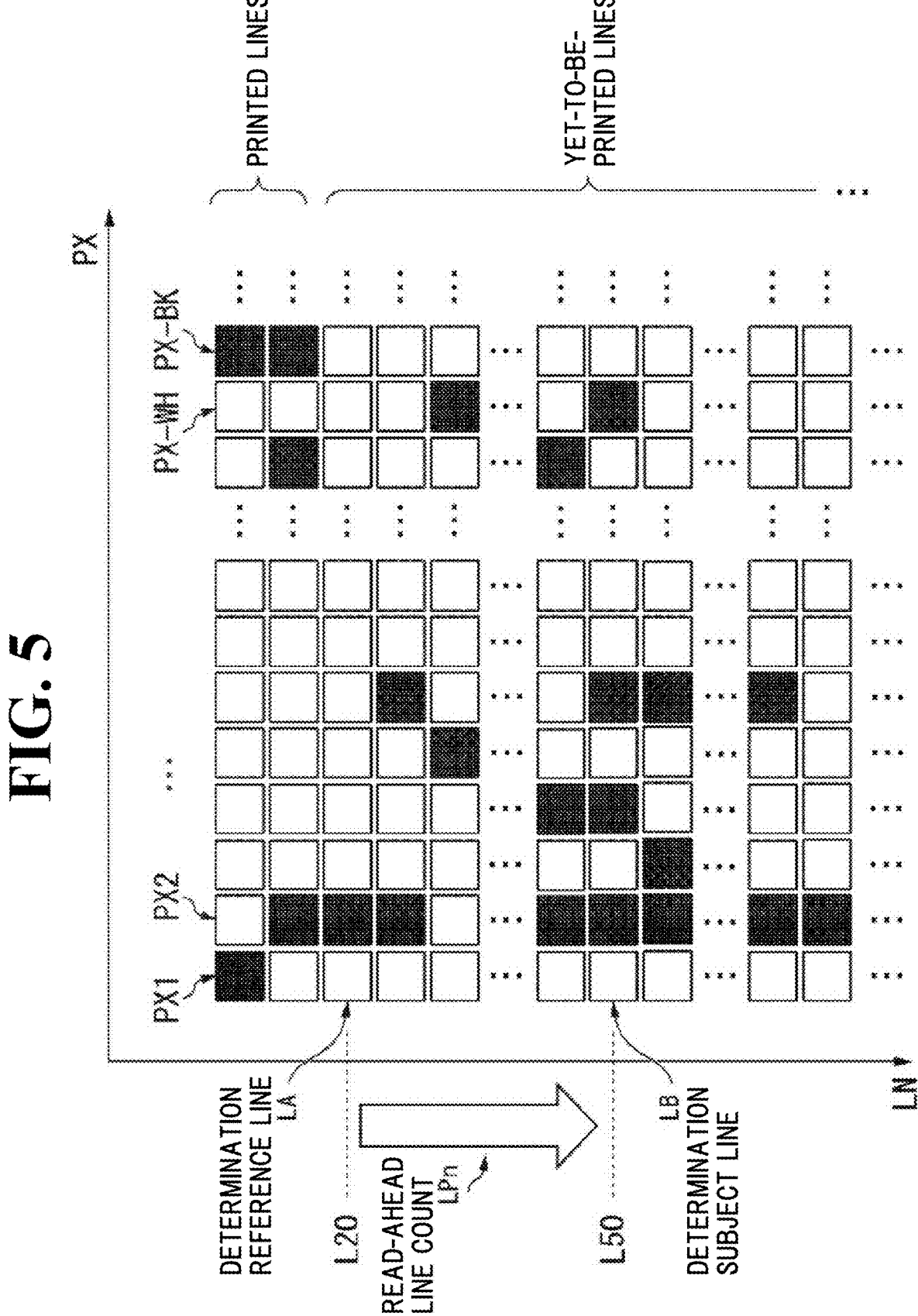
FIG. 5 is a view for illustrating an example of the print data acquired by a print data acquisition unit in the at least one embodiment.

FIG. 5 is a view for illustrating an example of the print data acquired by the print data acquisition unit 210 in the at least one embodiment. As described above, the print data is formed of the rows and columns (matrix) in the pixel PX direction and the line LN direction. In this example, the print data is the binarized data in which each pixel PX expresses the object to be printed in a binary value of black or white. The print data expresses the object to be printed by the black pixels PX-BK and the white pixels PX-WH.

That is, the print data acquisition unit 210 acquires the print data, which is formed of the plurality of lines LN and indicates the coloration state of each pixel PX included in the lines LN.

Returning to FIG. 4, the motor drive plan generation unit 220 generates, based on the print data acquired by the print data acquisition unit 210, information on a plan for driving the motor 110 and the thermal head 120 (that is, a motor drive plan). An example of the motor drive plan is described with reference to FIG. 6.

Figure 6:
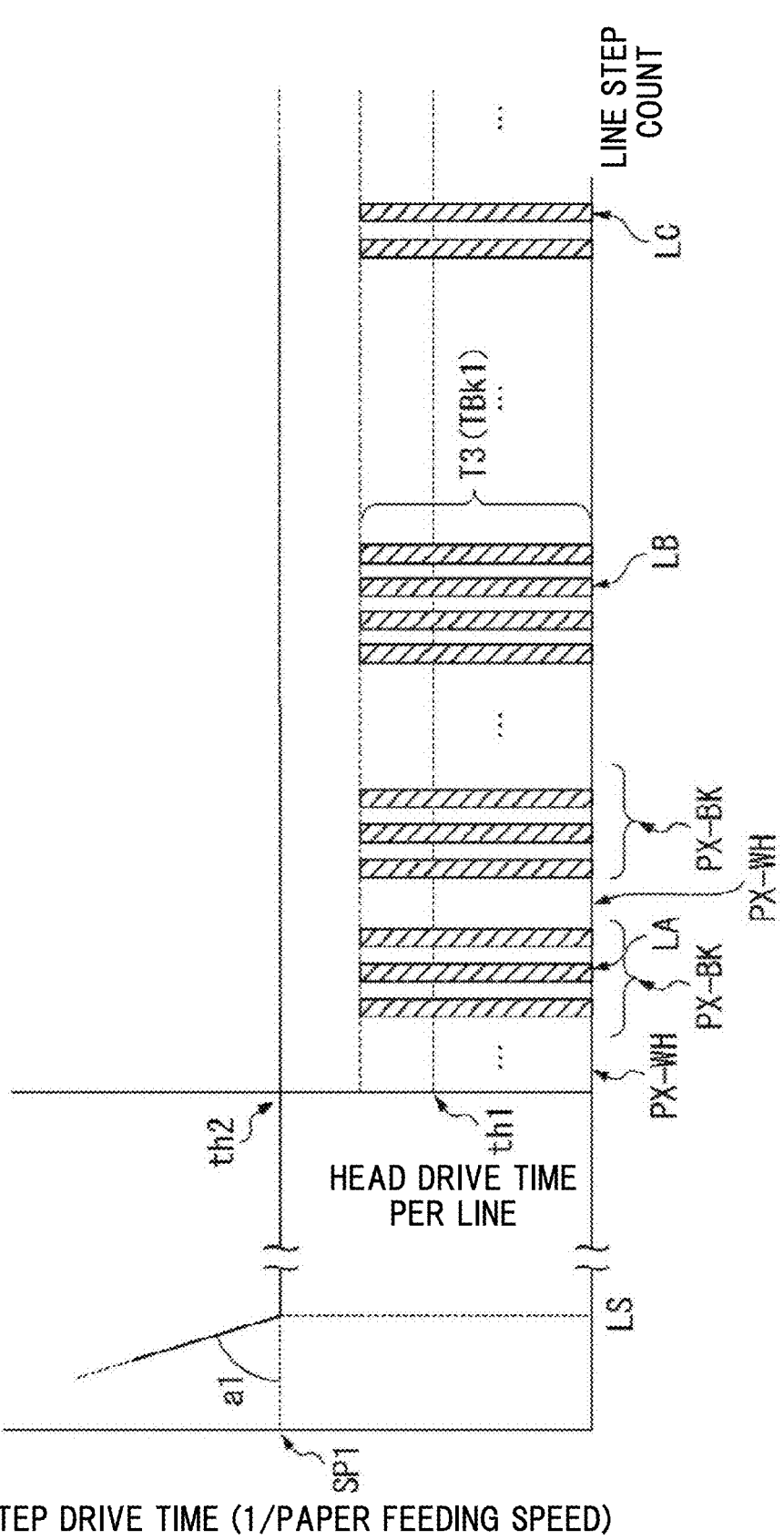
FIG. 6 is a graph for showing an example of a motor drive plan in the at least one embodiment.

FIG. 6 is a graph for showing an example of the motor drive plan in the at least one embodiment. A horizontal axis of FIG. 6 represents a line step count of the motor 110. A right direction of the horizontal axis is an advancement direction (future direction) of step driving. The line step count is the number of lines LN of the heat-sensitive paper 310 moved by the motor 110. A vertical axis of FIG. 6 represents step drive time and head drive time. An upper direction of the vertical axis is a direction of increase of the step drive time and a direction of increase of the head drive time.

FIG. 6 schematically shows, of the print data illustrated in FIG. 5, states of driving the thermal head 120 for a pixel PX. In the example of FIG. 6, driving states of a heating element H for printing a pixel PX2 (that is, the heating element H2 illustrated in FIG. 2C) among the heating elements H of the thermal head 120 are shown. Focusing an attention on the pixel PX2 of FIG. 5, in order from the uppermost line LN of FIG. 5, a white pixel PX-WH, a black pixel PX-BK, a black pixel PX-BK, a black pixel PX-BK, a white pixel PX-WH, . . . are arrayed. FIG. 6 shows the driving states of the heating element H2 which prints the pixel PX2 of FIG. 5. That is, FIG. 6 shows how, in order from the leftmost line LN, the white pixel PX-WH, the black pixel PX-BK, the black pixel PX-BK, the black pixel PX-BK, the white pixel PX-WH, . . . are printed.

Returning to FIG. 4, the motor drive plan generation unit 220 generates the motor drive plan to control a relative moving speed of the heat-sensitive paper 310 moved by the motor 110. That is, the motor drive plan generation unit 220 serves as a speed control unit which controls a moving speed of the heat-sensitive paper 310. The motor drive unit 230 supplies, based on the motor drive plan generated by the motor drive plan generation unit 220, a drive current for step driving the motor 110 for each line LN to the motor 110. The head drive unit 250 supplies an electric current (that is, head drive current) for heating the thermal head 120 for each pixel PX to the thermal head 120.

As described above, the printer apparatus 1 according to the at least one embodiment is what is called a line printer. The printer apparatus 1 sequentially prints the plurality of lines LN by repeating, for each line LN of the print data, the operation of moving the heat-sensitive paper 310 by one line, then stopping the movement of the heat-sensitive paper 310, and driving the thermal head 120 to color the heat-sensitive paper 310.

Now, drive time of a heating element H of the thermal head 120 is described. The heating element H generates heat by being supplied with the drive current. The drive time of the heating element H of the thermal head 120 means continuous supply time of the drive current supplied to the heating element H. The drive time of the heating element H of the thermal head 120 is also referred to as the "head drive time." The head drive time is described in detail with reference to FIG. 6. In the following description, generation of the motor drive plan by the motor drive plan generation unit 220 to control the driving states of the motor 110 and the thermal head 120 is also simply referred to as "control by the motor drive plan generation unit 220."

[In Regard to Step Drive Time]

The step drive time is total time for printing one line of movement time T1 for the heat-sensitive paper 310 from when the motor 110 starts moving the heat-sensitive paper 310 to when the motor 110 stops moving the heat-sensitive paper 310, wait time T2 from when the heat-sensitive paper 310 is stopped to when the thermal head 120 starts being driven, head drive time T3, and wait time T4 until, after the thermal head 120 stops being driven, the heat-sensitive paper 310 starts being moved in order to print the next line LN. Intermittent movement of the heat-sensitive paper 310 by repeating the movement of the heat-sensitive paper 310 (movement time T1), waiting for the thermal head to be driven (wait time T2), driving the thermal head (head drive time T3), and waiting for the start of the movement of the heat-sensitive paper 310 (wait time T4) is also referred to as "step driving."

The step drive time is controlled by rpm of the motor 110 specified by the motor drive plan generated by the motor drive plan generation unit 220. The motor drive plan increases, at the start of printing, rpm of the motor 110 from zero (0) at a predetermined acceleration rate. The predetermined acceleration rate is also referred to as a "paper feeding acceleration rate a1 at the start of printing." As a result, the relative moving speed of the heat-sensitive paper 310 is increased from zero (0). That is, the motor drive plan generation unit 220 reduces, at the start of printing, the step drive time from infinity (zero speed) with a predetermined slope. The predetermined slope corresponds to a reciprocal of the paper feeding acceleration rate a1 at the start of printing described above.

Here, the times (the movement time T1, the wait time T2, the head drive time T3, and the wait time T4) of the step driving are each a very short time. Accordingly, the heat-sensitive paper 310 being step driven continuously can also be said to be moved at an average speed. The average moving speed of the heat-sensitive paper 310 during the continuous step driving is also referred to as "steady paper feeding speed SP1." Here, a reciprocal of the steady paper feeding speed SP1 can also be said to be the step drive time under a steady paper feeding state. The step drive time under the steady paper feeding state is also referred to as "steady step drive time." That is, the steady step drive time is the reciprocal of the steady paper feeding speed SP1.

Of the vertical axis of FIG. 6, the upper direction is the direction of increase of the step drive time, and is a direction of reduction of the paper feeding speed. That is, the graph of FIG. 6 shows that, as the step drive time is reduced, the paper feeding speed is increased.

In the example shown in FIG. 6, after the printing is started, as the time passes, the step drive time is reduced with the predetermined slope (slope corresponding to the paper feeding acceleration rate a1 at the start of printing), and reaches the steady paper feeding speed SP1 (that is, the steady step drive time) at a steady speed transition line LS.

[In Regard to Head Drive Time]

The head drive time T3 is time for applying, when printing a black pixel PX-BK, an amount of heat that exceeds the coloration threshold value of the heat-sensitive paper 310 to the heat-sensitive paper 310. In the following description, the head drive time T3 is also referred to as "black pixel drive time TBk1." The head drive time T3 is set to a value with which the coloration threshold value th1 of the heat-sensitive paper 310 is exceeded. The head drive time T3 is a part of the step drive time, and hence does not exceed the step drive time described above. That is, the step drive time can be said to be an upper limit value of the head drive time (upper limit head drive time value th2).

[In Regard to Time Division Driving of Thermal Head]

In a case of a line printer like the printer apparatus 1, printing is performed for each line LN, and hence instantaneous power consumption is changed depending on the number PN of colored pixels (that is, the number of black pixels PX-BK) per line. For example, as the number PN of colored pixels per line becomes larger, instantaneous power consumption becomes larger.

Figure 7:
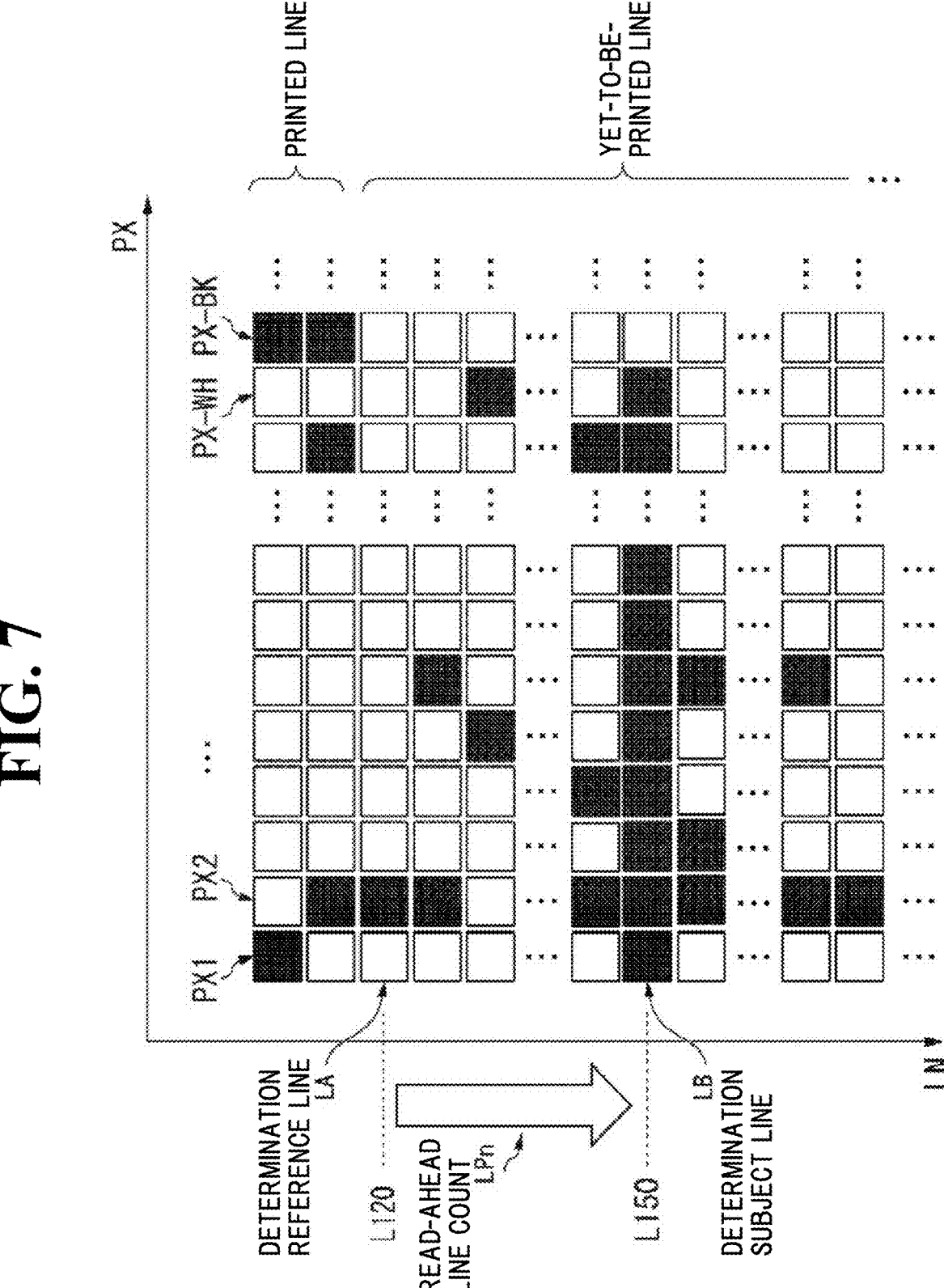
FIG. 7 is a view for illustrating an example of print data in which there is a line in which the number of colored pixels exceeds a predetermined value.

FIG. 7 is a view for illustrating an example of the print data in which there is a line LN in which the number PN of colored pixels exceeds a predetermined value. In the example illustrated in FIG. 7, the number PN of colored pixels of a line L150 exceeds the predetermined value. For the driving of the heating elements H of the thermal head 120, electric power supplied from a power supply circuit (not shown) of the printer apparatus 1 is used. Generally, a power supply circuit cannot supply electric power exceeding a maximum power that can be supplied. The power supply circuit of the printer apparatus 1 also has a maximum power that can be supplied. In a case of printing a line LN in which the number PN of colored pixels is relatively large, when all the heating elements H corresponding to the black pixels PX-BK are simultaneously driven, the instantaneous power consumption in the thermal head 120 may exceed the maximum power that can be supplied by the power supply circuit. When the instantaneous power consumption in the thermal head 120 exceeds the maximum power that can be supplied by the power supply circuit, the electric power supplied to the heating elements H becomes too short to exceed the coloration threshold value th1 for some pixels PX, and a reduction in printing quality, such as uneven coloring, may result.

In the printer apparatus 1 according to the at least one embodiment, in order to suppress the reduction in printing quality, for lines LN in which the number PN of colored pixels per line exceeds the predetermined value, the thermal head 120 is time-division driven. As used herein, the time division driving of the thermal head 120 refers to dividing the heating elements H included in the thermal head 120 into a plurality of blocks, and driving the heating elements H at a different drive timing for each block. In contrast, simultaneously driving all the heating elements H corresponding to the black pixels PX-BK is also simply referred to as "simultaneous driving."

In the following description, among the lines LN of the print data, a line LN for which the time division driving is performed is also referred to as "time-division driven line LD." Further, among the lines LN of the print data, a line LN for which the simultaneous driving is performed is also referred to as "simultaneously driven line." The printer apparatus 1 performs the simultaneous driving in a normal case in which the time division driving is not performed. Accordingly, in the following description, when the printer apparatus 1 performs the simultaneous driving, description that the simultaneous driving is performed may be omitted in some cases.

In the printer apparatus 1 according to the at least one embodiment, for a line LN in which the number PN of colored pixels per line exceeds the predetermined value (upper limit colored pixel count value th3), the thermal head 120 is time-division driven. The printer apparatus 1 uses the upper limit colored pixel count value th3 as a determination threshold value to determine whether to time-division drive or simultaneously drive the thermal head 120.

In the example illustrated in FIG. 7, the printer apparatus 1 determines to perform the time division driving for the line L150 in which the number PN of colored pixels exceeds the predetermined value. In the example illustrated in FIG. 5 described above, for a line L50, the number PN of colored pixels per line does not exceed the predetermined value (upper limit colored pixel count value th3). In this case, the printer apparatus 1 determines to simultaneously drive the thermal head 120 for the line L50.

[In Regard to Read-Ahead Control]

For the line LN for which the time division driving is performed, the step drive time becomes longer than that for the line LN for which the simultaneous driving is performed.

This is because, among the times forming the step driving, that is, the movement of the heat-sensitive paper 310 (movement time T1), waiting for the thermal head to be driven (wait time T2), driving the thermal head (head drive time T3), and waiting for the start of the movement of the heat-sensitive paper 310 (wait time T4), at least the head drive time T3 becomes longer than that in the simultaneous driving. Accordingly, when the line LN for which the simultaneous driving is performed and the line LN for which the time division driving is performed are mixed in the print data, the relative moving speed of the heat-sensitive paper 310 is changed. When the change in relative moving speed of the heat-sensitive paper 310 (that is, a deceleration and acceleration rate of the movement of the heat-sensitive paper 310) becomes large, a reduction in printing quality may result. It is preferred that the deceleration and acceleration rate of the movement of the heat-sensitive paper 310 be lower.

In the printer apparatus 1, when yet-to-be-printed data includes a line LN in which the number PN of colored pixels exceeds the predetermined value, the moving speed of the heat-sensitive paper 310 is gradually reduced from a timing that is a plurality of steps before printing of the line LN. The printer apparatus 1 suppresses the reduction in printing quality by setting the deceleration and acceleration rate of the movement of the heat-sensitive paper 310 lower. The control of gradually changing the moving speed of the heat-sensitive paper 310 from the timing that is the plurality of steps before the printing of the line LN is also referred to as "read-ahead control."

Figure 8:
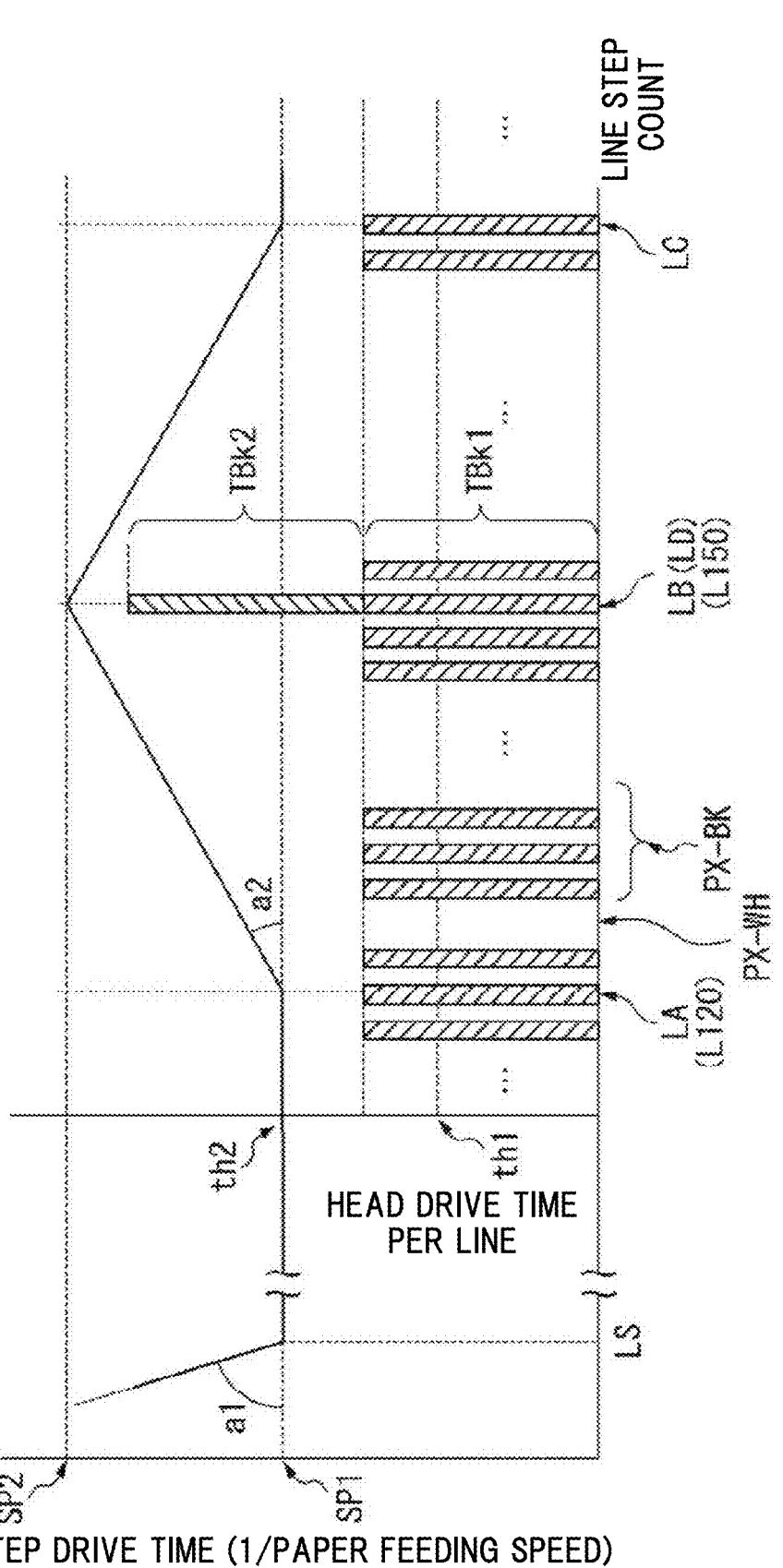
FIG. 8 is a graph for showing an example of a motor drive plan in which read-ahead control is performed.

FIG. 8 is a graph for showing an example of a motor drive plan in which the read-ahead control is performed. FIG. 8 shows a case in which the print data illustrated in FIG. 7 is printed by the read-ahead control. In the case of the example illustrated in FIG. 7, the line L150 is the line LN in which the number PN of colored pixels exceeds the predetermined value. The printer apparatus 1 divides the line L150 into two blocks for time division driving. That is, the line L150 is a time-division driven line LD. In the case of this example, the printer apparatus 1 prints the time-division driven line LD (in this example, the line L150) separately with the black pixel drive time TBk1 for the first block and black pixel drive time TBk2 for the second block. As a result, the head drive time T3 of the time-division driven line LD is total time of the black pixel drive time TBk1 for the first block and the black pixel drive time TBk2 for the second block.

In this case, the head drive time T3 of the time-division driven line LD is longer than the step drive time for the steady paper feeding speed SP1. That is, the head drive time T3 of the time-division driven line LD exceeds the upper limit head drive time value th2 for the steady paper feeding speed SP1. Accordingly, the printer apparatus 1 gradually reduces the moving speed of the heat-sensitive paper 310 so that the head drive time T3 of the time-division driven line LD falls within the step drive time of the time-division driven line LD.

In the case of this example, the printer apparatus 1 determines, at a timing to print a line L120 that is 30 steps before the line L150 is printed, to perform the time division driving for the line L150, and reduces the moving speed of the heat-sensitive paper 310. As a result, the moving speed of the heat-sensitive paper 310 becomes a reduced paper feeding speed SP2 at the line L150. The head drive time T3 for the line L150 falls to or below the upper limit head drive time value th2 for the reduced paper feeding speed SP2.

In FIG. 8, a slope a2 of the graph of the step drive time indicates the deceleration rate of the heat-sensitive paper 310. The printer apparatus 1 reduces, between a determination reference line LA and a determination subject line LB, the moving speed of the heat-sensitive paper 310 while keeping the deceleration rate of the heat-sensitive paper 310 constant.

As used herein, the determination reference line LA is any line LN of the print data. As an example, the determination reference line LA is a line LN to be printed in this step among yet-to-be-printed lines LN of the print data. The determination subject line LB is a line LN to be printed in a step later than the determination reference line LA among the yet-to-be-printed lines LN of the print data. A difference in line counts between the determination reference line LA and the determination subject line LB is also referred to as "read-ahead line count LPn." In the example of FIG. 8, the line L120 is the determination reference line LA, and the line L150 is the determination subject line LB. Further, in the example of FIG. 8, the read-ahead line count LPn is the difference in line counts between the line L150 and the line L120, that is, 30 lines.

That is, the printer apparatus 1 sets, among the yet-to-be-printed lines LN of the print data, a line LN to be printed later (that is, in the future) than the determination reference line LA by the read-ahead line count LPn as the determination subject line LB to determine whether or not the number PN of colored pixels in the determination subject line LB exceeds the predetermined value. In the example of FIG. 8, the printer apparatus 1 determines whether or not the number PN of colored pixels of the line LN to be printed later (that is, in the future) by 30 lines exceeds the predetermined value.

[In Regard to Read-Ahead Preheating Control]

Next, read-ahead preheating control is described. The read-ahead preheating control is control in which, in addition to the read-ahead control described above, the thermal head 120 is preheated in driving steps before a driving step in which the time-division driven line LD is printed. The preheating of the thermal head 120 is control of outputting a preheating current, which is a current for heating the thermal head 120 to such a degree as to prevent coloring of the heat-sensitive paper 310, to the thermal head 120 by the time the time-division driven line LD is printed.

Figure 9:
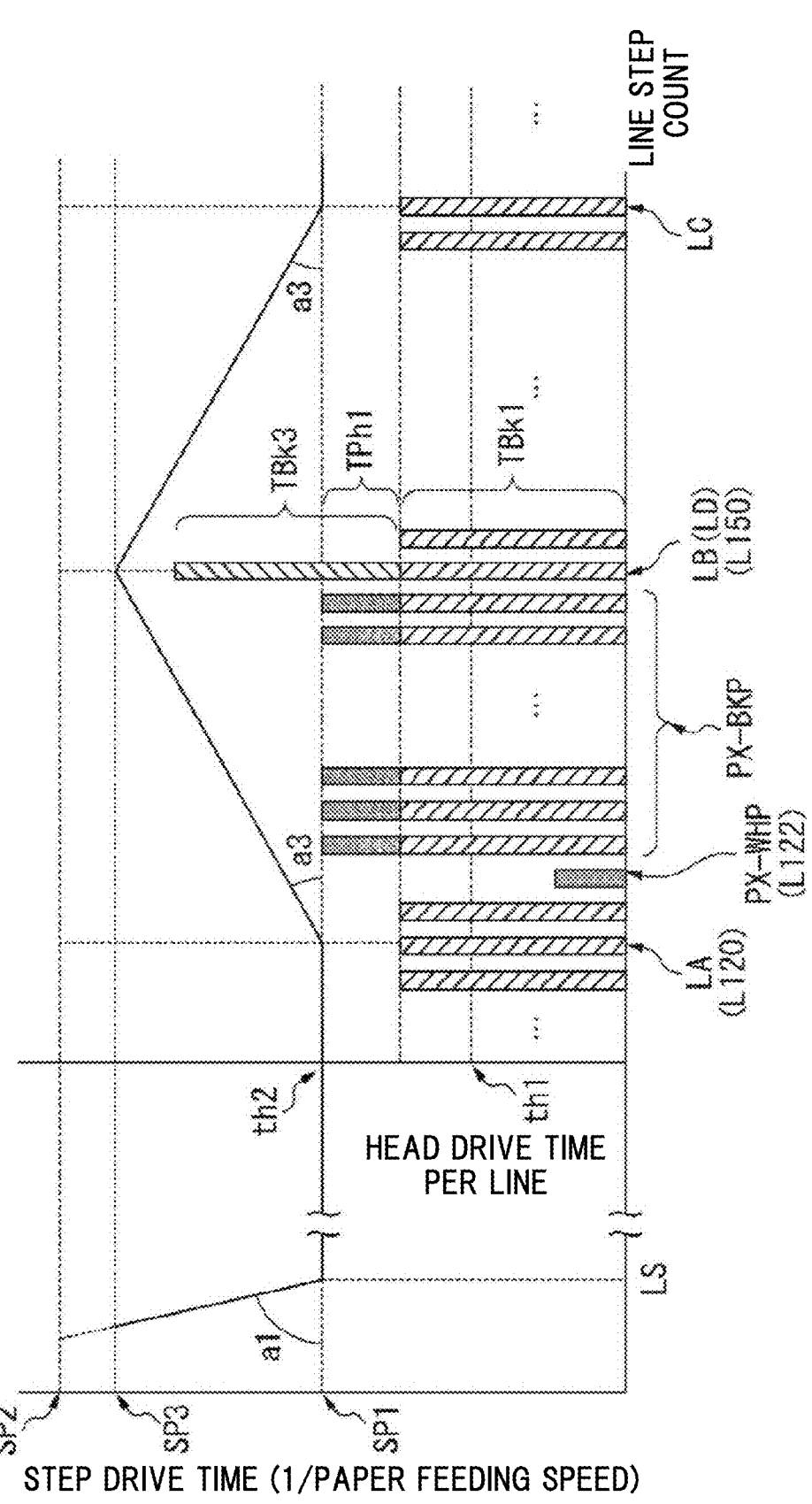
FIG. 9 is a graph for showing an example of a motor drive plan in which read-ahead preheating control is performed.

FIG. 9 is a graph for showing an example of a motor drive plan in which the read-ahead preheating control is performed. FIG. 9 shows a case in which the print data illustrated in FIG. 7 is printed by the read-ahead preheating control. In the case of the example illustrated in FIG. 7, the line L150 is the line LN in which the number PN of colored pixels exceeds the predetermined value. The printer apparatus 1 divides the line L150 into two blocks for time division driving. In the case of this example, the printer apparatus 1 prints the line L150 separately with the black pixel drive time TBk1 for the first block and black pixel drive time TBk3 for the second block. As a result, the head drive time T3 of the line L150 is total time of the black pixel drive time TBk1 for the first block and the black pixel drive time TBk3 for the second block.

Here, the printer apparatus 1 supplies, in the driving steps before the time-division driven line LD, a preheating current for preheating time TPh1 in addition to the black pixel drive time TBk1 to the thermal head 120. In the example shown in FIG. 9, the printer apparatus 1 supplies the preheating current for the preheating time TPh1 to the thermal head 120 also for white pixels PX-WH (for example, line L122). The preheating time TPh1 is smaller than the coloration threshold value th1 of the heat-sensitive paper 310. Accordingly, even when the preheating current for the preheating time TPh1 is allowed to flow through the thermal head 120 for the white pixels PX-WH (for example, line L122), the heat-sensitive paper 310 is not colored.

The thermal head 120 is heated to such a degree as to prevent coloring of the heat-sensitive paper 310 by the preheating current. With the thermal head 120 being pre-heated by the time the line LN to be printed reaches the time-division driven line LD, the head drive time T3 for coloring the heat-sensitive paper 310 for the time-division driven line LD can be set shorter than that in a case in which the preheating is not performed. That is, with the preheating, total time of the black pixel drive time TBk1 for the first block and the black pixel drive time TBk3 for the second block in the time-division driven line LD can be set shorter than total time of the black pixel drive time TBk1 for the first block and the black pixel drive time TBk2 for the second block in the case in which the preheating is not performed.

With the read-ahead preheating control described above, the moving speed of the heat-sensitive paper 310 for the time-division driven line LD can be increased as compared to the case in which the preheating is not performed. A reduced paper feeding speed SP3 being the moving speed of the heat-sensitive paper 310 for the time-division driven line LD in the case in which the read-ahead preheating control is performed is faster than the reduced paper feeding speed SP2 described above. That is, the moving speed of the heat-sensitive paper 310 becomes the reduced paper feeding speed SP3 at the time-division driven line LD (line L150). The head drive time T3 for the time-division driven line LD falls to or below the upper limit head drive time value th2 for the reduced paper feeding speed SP3.

As a result, a slope a3 of the graph of the step drive time (that is, the deceleration rate of the heat-sensitive paper 310) can be made smaller than the slope a2 described above (that is, the deceleration rate of the heat-sensitive paper 310 in the case in which the preheating is not performed). That is, the printer apparatus 1 can further reduce the deceleration rate of the heat-sensitive paper 310 by the read-ahead preheating control. In this manner, the printer apparatus 1 can reduce the change in speed of the heat-sensitive paper 310 by performing the read-ahead preheating control, and hence can suppress the reduction in printing quality in the case in which the time division driving is performed.

Profiles of the graphs of the step drive time and the head drive time with respect to the line step count shown in FIG. 6, FIG. 8, and FIG. 9 described above are each also referred to as "motor speed plan." The control unit 20 in the at least one embodiment performs printing by controlling the motor 110 and the thermal head 120 while updating the motor speed plan by the read-ahead preheating control. A flow of operation of the control unit 20 is described.

[Flow of Operation of Control Unit]

Figure 10:
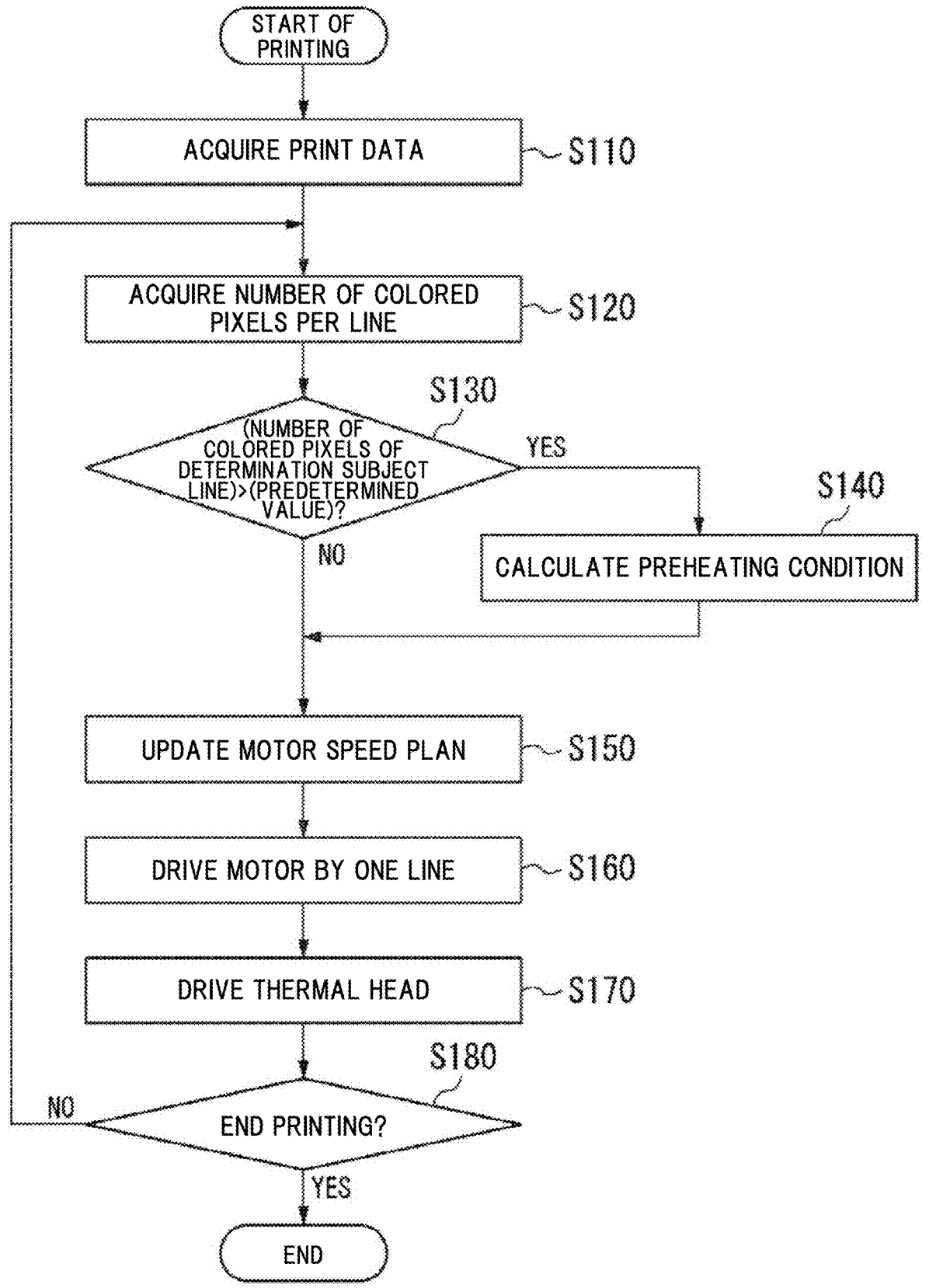
FIG. 10 is a chart for illustrating an example of a flow of operation of the control unit in the at least one embodiment.

FIG. 10 is a chart for illustrating an example of the flow of the operation of the control unit 20 in the at least one embodiment. Referring to FIG. 10, description is made of the flow of the operation of the control unit 20 in the case in which the read-ahead preheating control described above is performed.

(Step S110) The print data acquisition unit 210 acquires the print data. In this example, the print data acquisition unit 210 acquires the print data illustrated in FIG. 5, or the print data illustrated in FIG. 7. FIG. 5 shows an example of the print data that does not include the line LN for which the time division driving is performed, and FIG. 7 shows an example of the print data that includes the line LN for which the time division driving is performed.

(Step S120) The motor drive plan generation unit 220 acquires the number PN of colored pixels per line for each of the yet-to-be-printed lines LN of the print data acquired in Step S110. More specifically, the motor drive plan generation unit 220 acquires, among the yet-to-be-printed lines LN of the print data, the number PN of colored pixels of the determination subject line LB that is later than the determination reference line LA being a current driving step by the read-ahead line count LPn.

(Step S130) The motor drive plan generation unit 220 determines whether or not the determination subject line LB is a time-division driven line LD. As described above, the time-division driven line LD is a line LN in which the number PN of colored pixels per line exceeds the predetermined value. When the motor drive plan generation unit 220 determines that the number PN of colored pixels of the determination subject line LB does not exceed the predetermined value, that is, that the determination subject line LB is a simultaneously driven line (NO in Step S130), the process is advanced to Step S150. When the motor drive plan generation unit 220 determines that the number PN of colored pixels of the determination subject line LB exceeds the predetermined value (YES in Step S130), the process is advanced to Step S140.

(Step S140) The preheating control unit 240 calculates a preheating condition of the thermal head 120. More specifically, when the determination subject line LB is a time-division driven line LD (specific line) being a line LN in which the number PN of colored pixels exceeds the predetermined value, the preheating control unit 240 causes the head drive unit 250 to output the preheating current by the time the time-division driven line LD (specific line) is printed.

That is, the preheating control unit 240 calculates the preheating condition by the read-ahead preheating control. An example of the calculation of the preheating condition by the preheating control unit 240 is described.

(1) The preheating control unit 240 controls a heating state of the thermal head 120 to be obtained by the preheating current by changing, based on the number PN of colored pixels of the determination subject line LB, at least one of the number of lines for which the preheating current is output or an output time of the preheating current per line LN.

As described above, the preheating control unit 240 calculates, when the number PN of colored pixels of the determination subject line LB exceeds the predetermined value (upper limit colored pixel count value th3), the preheating condition by setting, to a prescribed value, each of the number of lines for which the preheating current is output and the output time of the preheating current per line LN. Here, for example, the number of divided parts of the time division driving of the thermal head 120 may be changed to two or three depending on the number PN of colored pixels. In this case, the preheating control unit 240 may calculate the preheating condition by setting the number of lines for which the preheating current is output and an output time of the preheating current per line LN in the case of the time division driving by dividing into two parts, and the number of lines for which the preheating current is output and an output time of the preheating current per line LN in the case of the time division driving by dividing into three parts to be different from each other.

That is, the preheating control unit 240 may control the heating state of the thermal head 120 to be obtained by the preheating current by changing the output time of the preheating current per line LN.

Further, the preheating control unit 240 may control the heating state of the thermal head 120 to be obtained by the preheating current by changing the number of lines for which the preheating current is output.

According to the printer apparatus 1 having the above-mentioned configuration, the preheating depending on the number of divided parts of the time division driving can be performed, and hence, even when the number of divided parts of the time division driving is changed, the reduction in printing quality can be suppressed.

(2) The preheating control unit 240 controls the heating state of the thermal head 120 to be obtained by the preheating current by changing, based on the number of yet-to-be-printed lines up to the determination subject line LB, at least one of the number of lines for which the preheating current is output or the output time of the preheating current per line LN.

As an example, the preheating control unit 240 may perform the read-ahead preheating control with a variable read-ahead line count LPn. With a change in the read-ahead line count LPn, the slope a3 of the paper feeding speed obtained by the time-division driven line LD can be changed. For example, as the read-ahead line count LPn becomes smaller, the slope a3 of the paper feeding speed obtained by the time-division driven line LD becomes larger. In this case, time for which the step driving can be performed at a relatively high steady paper feeding speed SP1 becomes longer, and time required for printing can be reduced. Further, as the read-ahead line count LPn becomes larger, the slope a3 of the paper feeding speed obtained by the time-division driven line LD becomes smaller. In this case, the deceleration or acceleration rate of the paper feeding speed obtained by the time-division driven line LD becomes lower, and the reduction in printing quality caused by the change in speed can be suppressed. In this manner, when the read-ahead preheating control with a variable read-ahead line count LPn is performed, the preheating control unit 240 may choose whether to give higher priority to the time required for printing or to the printing quality by changing, based on the number of yet-to-be-printed lines up to the determination subject line LB, at least one of the number of lines for which the preheating current is output or the output time of the preheating current per line LN from a reference value. Further, the preheating control unit 240 may change the choice on whether to give priority to the time required for printing or to the printing quality based on a setting by the user of the printer apparatus 1.

The preheating control unit 240 outputs the calculated preheating condition to the motor drive plan generation unit 220.

(Step S150) The motor drive plan generation unit 220 updates a motor control plan. More specifically, when the preheating control unit 240 has calculated the preheating condition, the motor drive plan generation unit 220 updates the motor control plan based on the calculated preheating condition. As a result, the motor control plan is updated from the motor control plan without preheating, which is shown in FIG. 6, to the motor control plan with preheating, which is shown in FIG. 9.

As described above, the motor drive plan generation unit 220 updates the motor drive plan by setting the deceleration rate of the paper feeding speed from the determination reference line LA to the time-division driven line LD to the slope a2 shown in FIG. 8, or the slope a3 shown in FIG. 9. Here, the slope a2 shown in FIG. 8 and the slope a3 shown in FIG. 9 are both smaller than the slope of the paper feeding acceleration rate a1 at the start of printing. That is, the motor drive plan generation unit 220 (speed control unit) reduces the relative moving speed with a deceleration rate that is equal to or lower than the paper feeding acceleration rate a1 at the start of printing, which is the acceleration rate of the motor 110 at the start of printing. The deceleration rate of the paper feeding speed (the slope of the graph) shown in FIG. 8 is merely an example. For example, the motor drive plan generation unit 220 (speed control unit) may reduce the relative moving speed with a deceleration rate that is equal to or higher than the paper feeding acceleration rate a1 at the start of printing, which is the acceleration rate of the motor 110 at the start of printing. Here, the deceleration rate (the slope of the graph) has a relationship of a reciprocal of the time required for deceleration. For example, as the deceleration rate (the slope of the graph) becomes higher, the time required for deceleration becomes shorter. When the time required for deceleration becomes shorter, the read-ahead line count LPn can be reduced further. When the read-ahead line count LPn is small, an amount of information stored in the storage unit (not shown) by the control unit 20 can be made relatively small. That is, the motor drive plan generation unit 220 (speed control unit) can make the amount of information stored in the storage unit (not shown) relatively small by reducing the relative moving speed with the deceleration rate that is equal to or higher than the paper feeding acceleration rate a1 at the start of printing, which is the acceleration rate of the motor 110 at the start of printing.

According to the printer apparatus 1 having the above-mentioned configuration, the change in speed of the heat-sensitive paper 310 in the case in which the time division driving is performed can be suppressed, and the reduction in printing quality caused by the change in speed of the heat-sensitive paper 310 can be suppressed.

(Step S160) The motor drive unit 230 drives the motor 110 by one line based on the motor control plan updated in Step S150.

(Step S170) The head drive unit 250 acquires, from the print data acquired in Step S110, print data corresponding to the line LN indicated by the motor control plan updated in Step S150. The head drive unit 250 supplies, based on information on the black pixels PX-BK and the white pixels PX-WH indicated by the acquired print data, the drive current to the heating elements H of the thermal head 120. As a result, a coloration pattern corresponding to one line of the print data is printed on the heat-sensitive paper 310.

(Step S180) The motor drive plan generation unit 220 determines whether or not all pieces of the print data acquired by the print data acquisition unit 210 have been printed. When the motor drive plan generation unit 220 determines that there is a yet-to-be-printed line LN of the print data acquired by the print data acquisition unit 210 (NO in Step S180), the process is returned to Step S120 to continue the print processing with the next line LN. When the motor drive plan generation unit 220 determines that all pieces of the print data acquired by the print data acquisition unit 210 have been printed (YES in Step S180), the series of steps of the print processing is ended.

As described above, the printer apparatus 1 according to the at least one embodiment performs the read-ahead preheating control. That is, the printer apparatus 1 performs the preheating only in a case in which there is a time-division driven line LD in the print data (that is, a case in which the preheating is required). As a result, the printer apparatus 1 can reduce the power consumption as compared to a related art in which the preheating is always performed. Further, the printer apparatus 1 can reduce, as compared to the related art in which the read-ahead control is not performed, the acceleration and deceleration rate of the heat-sensitive paper 310 in the case in which there is a time-division driven line LD. Consequently, according to the printer apparatus 1, the reduction in printing quality can be suppressed by reducing a sudden deceleration in the case in which there is a time-division driven line LD while enabling the printing at relatively high speed in a case in which there is no time-division driven line LD. That is, according to the printer apparatus 1 of the at least one embodiment, the reduction in printing quality in the case in which there is a time-division driven line LD can be suppressed while achieving high speed printing and low power consumption in the steady state.

All or a part of the functions of the control unit 20 of the printer apparatus 1 described above may be recorded as a program on a computer-readable recording medium, and this program may be executed by a computer system. The computer system includes an OS and a peripheral device and other such hardware. Further, examples of the computer-readable recording medium include a flexible disk, a magneto-optical disk, a read only memory (ROM), a CD-ROM, and other such portable medium, a hard disk drive built into the computer system and other such storage device, and a volatile memory (random access memory (RAM)) provided by a server or the like on the Internet or other such network. The volatile memory is an example of a recording medium which holds a program for a fixed period of time.

In addition, the above-mentioned program may be transmitted to another computer system through a transmission medium, for example, the Internet or other such network or a telephone line or other such communication line.

Further, the above-mentioned program may also be a program for implementing all or a part of the above-mentioned functions. The program for implementing a part of the above-mentioned functions may be a program capable of implementing the above-mentioned functions in combination with a program recorded in advance in the computer system, which is a so-called differential program.

While the at least one embodiment of the present invention has been described above with reference to the drawings, specific configurations are not limited to those in the at least one embodiment described above, and design changes and the like within a scope that does not depart from the gist of the present invention are also included in the present invention.

What is claimed is:

1. A control device, comprising:
   a print data acquisition unit configured to acquire print data, which is formed of a plurality of lines and indicates a coloration state of each pixel included in the plurality of lines;
   a head drive unit configured to supply, to a thermal head formed of a plurality of heating elements each corresponding to the pixel, an electric current for heating the thermal head for each pixel;
   a motor drive unit configured to supply, to a motor configured to move heat-sensitive paper relative to the thermal head, a drive current for step driving the motor for each line;
   a speed control unit configured to control, based on the number of colored pixels of a determination subject line among yet-to-be-printed lines of the print data, a relative moving speed of the heat-sensitive paper moved by the motor; and
   a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed,
   wherein the preheating control unit is configured to control a heating state of the thermal head to be obtained by the preheating current by changing, based on the number of colored pixels of the determination subject line, at least one of the number of lines for which the preheating current is output or an output time of the preheating current per line.

2. The control device according to any one of the preceding claims, wherein the speed control unit is configured to reduce the relative moving speed with a deceleration rate equal to or lower than an acceleration rate of the motor at a start of printing.

3. A control device, comprising:
   a print data acquisition unit configured to acquire print data, which is formed of a plurality of lines and indicates a coloration state of each pixel included in the plurality of lines;
   a head drive unit configured to supply, to a thermal head formed of a plurality of heating elements each corresponding to the pixel, an electric current for heating the thermal head for each pixel;
   a motor drive unit configured to supply, to a motor configured to move heat-sensitive paper relative to the thermal head, a drive current for step driving the motor for each line;
   a speed control unit configured to control, based on the number of colored pixels of a determination subject line among yet-to-be-printed lines of the print data, a relative moving speed of the heat-sensitive paper moved by the motor; and
   a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed,
   wherein the preheating control unit is configured to control a heating state of the thermal head to be obtained by the preheating current by changing, based on the number of yet-to-be-printed lines up to the determination subject line, at least one of the number of lines for which the preheating current is output or an output time of the preheating current per line.

4. A control device, comprising:
   a print data acquisition unit configured to acquire print data, which is formed of a plurality of lines and indicates a coloration state of each pixel included in the plurality of lines;
   a head drive unit configured to supply, to a thermal head formed of a plurality of heating elements each corresponding to the pixel, an electric current for heating the thermal head for each pixel;
   a motor drive unit configured to supply, to a motor configured to move heat-sensitive paper relative to the thermal head, a drive current for step driving the motor for each line;
   a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed, wherein the preheating control unit is configured to control a heating state of the thermal head to be obtained by the preheating current by changing an output time of the preheating current per line.

5. A control device, comprising:

a print data acquisition unit configured to acquire print data, which is formed of a plurality of lines and indicates a coloration state of each pixel included in the plurality of lines;

a head drive unit configured to supply, to a thermal head formed of a plurality of heating elements each corresponding to the pixel, an electric current for heating the thermal head for each pixel;

a motor drive unit configured to supply, to a motor configured to move heat-sensitive paper relative to the thermal head, a drive current for step driving the motor for each line;

a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed, wherein the preheating control unit is configured to control a heating state of the thermal head to be obtained by the preheating current by changing the number of lines for which the preheating current is output.

6. A printer apparatus, comprising:

a control device;

a thermal head; and a motor, wherein the control device comprises:

a print data acquisition unit configured to acquire print data, which is formed of a plurality of lines and indicates a coloration state of each pixel included in the plurality of lines;

a head drive unit configured to supply, to the thermal head formed of a plurality of heating elements each corresponding to the pixel, an electric current for heating the thermal head for each pixel;

a motor drive unit configured to supply, to the motor configured to move heat-sensitive paper relative to the thermal head, a drive current for step driving the motor for each line;

a speed control unit configured to control, based on the number of colored pixels of a determination subject line among yet-to-be-printed lines of the print data, a relative moving speed of the heat-sensitive paper moved by the motor; and

18 a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed, wherein the preheating control unit is configured to control a heating state of the thermal head to be obtained by the preheating current by changing, based on the number of colored pixels of the determination subject line, at least one of the number of lines for which the preheating current is output or an output time of the preheating current per line.

7. A control method, comprising:

acquiring print data, which is formed of a plurality of lines and indicates a coloration state of each pixel included in the plurality of lines;

supplying, to a thermal head formed of a plurality of heating elements each corresponding to the pixel, an electric current for heating the thermal head for each pixel;

supplying, to a motor configured to move heat-sensitive paper relative to the thermal head, a drive current for step driving the motor for each line;

controlling, based on the number of colored pixels of a determination subject line among yet-to-be-printed lines of the print data, a relative moving speed of the heat-sensitive paper moved by the motor;

outputting, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed; and controlling a heating state of the thermal head to be obtained by the preheating current by changing, based on the number of colored pixels of the determination subject line, at least one of the number of lines for which the preheating current is output or an output time of the preheating current per line.

8. A control method, comprising:

acquiring print data, which is formed of a plurality of lines and indicates a coloration state of each pixel included in the plurality of lines;

supplying, to a thermal head formed of a plurality of heating elements each corresponding to the pixel, an electric current for heating the thermal head for each pixel;

supplying, to a motor configured to move heat-sensitive paper relative to the thermal head, a drive current for step driving the motor for each line;

controlling, based on the number of colored pixels of a determination subject line among yet-to-be-printed lines of the print data, a relative moving speed of the heat-sensitive paper moved by the motor;

outputting, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed; and controlling a heating state of the thermal head to be obtained by the preheating current by changing, based on the number of yet-to-be-printed lines up to the determination subject line, at least one of the number of lines for which the preheating current is output or an output time of the preheating current per line.

9. A control method, comprising:

acquiring print data, which is formed of a plurality of lines and indicates a coloration state of each pixel included in the plurality of lines;

supplying, to a thermal head formed of a plurality of heating elements each corresponding to the pixel, an electric current for heating the thermal head for each pixel;

supplying, to a motor configured to move heat-sensitive paper relative to the thermal head, a drive current for step driving the motor for each line;

controlling, based on the number of colored pixels of a determination subject line among yet-to-be-printed lines of the print data, a relative moving speed of the heat-sensitive paper moved by the motor;

outputting, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed; and controlling a heating state of the thermal head to be obtained by the preheating current by changing an output time of the preheating current per line.

10. A control method, comprising:

acquiring print data, which is formed of a plurality of lines and indicates a coloration state of each pixel included in the plurality of lines;

supplying, to a thermal head formed of a plurality of heating elements each corresponding to the pixel, an electric current for heating the thermal head for each pixel;

supplying, to a motor configured to move heat-sensitive paper relative to the thermal head, a drive current for step driving the motor for each line;

controlling, based on the number of colored pixels of a determination subject line among yet-to-be-printed lines of the print data, a relative moving speed of the heat-sensitive paper moved by the motor;

outputting, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed; and control a heating state of the thermal head to be obtained by the preheating current by changing the number of lines for which the preheating current is output.

11. A printer apparatus, comprising:

a control device;

a thermal head; and a motor, wherein the control device comprises:

a print data acquisition unit configured to acquire print data, which is formed of a plurality of lines and indicates a coloration state of each pixel included in the plurality of lines;

a head drive unit configured to supply, to the thermal head formed of a plurality of heating elements each corresponding to the pixel, an electric current for heating the thermal head for each pixel;

a motor drive unit configured to supply, to the motor configured to move heat-sensitive paper relative to the thermal head, a drive current for step driving the motor for each line;

a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed, wherein the preheating control unit is configured to control a heating state of the thermal head to be obtained by the preheating current by changing, based on the number of yet-to-be-printed lines up to the determination subject line, at least one of the number of lines for which the preheating current is output or an output time of the preheating current per line.

12. A printer apparatus, comprising:

a control device;

a thermal head; and a motor, wherein the control device comprises:

a print data acquisition unit configured to acquire print data, which is formed of a plurality of lines and indicates a coloration state of each pixel included in the plurality of lines;

a head drive unit configured to supply, to the thermal head formed of a plurality of heating elements each corresponding to the pixel, an electric current for heating the thermal head for each pixel;

a motor drive unit configured to supply, to the motor configured to move heat-sensitive paper relative to the thermal head, a drive current for step driving the motor for each line;

a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed, wherein the preheating control unit is configured to control a heating state of the thermal head to be obtained by the preheating current by changing an output time of the preheating current per line.

13. A printer apparatus, comprising:

a control device;

a thermal head; and a motor, wherein the control device comprises:

a print data acquisition unit configured to acquire print data, which is formed of a plurality of lines and indicates a coloration state of each pixel included in the plurality of lines;

a head drive unit configured to supply, to the thermal head formed of a plurality of heating elements each corresponding to the pixel, an electric current for heating the thermal head for each pixel;

a motor drive unit configured to supply, to the motor configured to move heat-sensitive paper relative to the thermal head, a drive current for step driving the motor for each line;

a speed control unit configured to control, based on the number of colored pixels of a determination subject line among yet-to-be-printed lines of the print data, a relative moving speed of the heat-sensitive paper moved by the motor; and a preheating control unit configured to cause the head drive unit to output, when the determination subject line is a specific line being a line in which the number of colored pixels of the determination subject line exceeds a predetermined value, a preheating current being an electric current for heating the thermal head to such a degree as to prevent coloring of the heat-sensitive paper by a time the specific line is printed, wherein the preheating control unit is configured to control a heating state of the thermal head to be obtained by the preheating current by changing the number of lines for which the preheating current is output.

* * * * *